United States Patent [19]

Fujita et al.

[11] Patent Number: 4,516,925

[45] Date of Patent: May 14, 1985

[54] PELLETIZING DIE FOR SYNTHETIC RESIN EXTRUDING MACHINE

[75] Inventors: Daijiro Fujita; Akihiko Motoo; Yoshiki Maki, all of Hiroshima, Japan

[73] Assignee: The Japan Steel Works, Ltd., Tokyo, Japan

[21] Appl. No.: 560,307

[22] Filed: Dec. 12, 1983

[30] Foreign Application Priority Data

Dec. 10, 1982 [JP] Japan .................. 57-186008[U]

[51] Int. Cl.³ .......................................... A01J 21/00
[52] U.S. Cl. ...................... 425/463; 425/464; 425/311
[58] Field of Search ............... 425/379, 463, 464, 311

[56] References Cited

U.S. PATENT DOCUMENTS

| 3,049,753 | 8/1962 | Ogden et al. | 425/464 |
| 3,461,490 | 8/1969 | Cottingham | 425/379 |
| 4,167,386 | 9/1979 | Mallay | 425/463 |

Primary Examiner—Willard E. Hoag
Attorney, Agent, or Firm—Sughrue, Mion, Zinn, Macpeak and Seas

[57] ABSTRACT

The pelletizing die for a synthetic resin extruding machine has a sintered hard tip which is shaped such that the outlet side is small as compared to the inlet side. A sintered hard tip pressing plate is formed to surround the sintered hard tip, and the sintered hard tip and sintered hard tip pressing plate are fixedly adhered to the die body by solder.

6 Claims, 8 Drawing Figures

PELLETIZING DIE FOR SYNTHETIC RESIN EXTRUDING MACHINE

BACKGROUND OF THE INVENTION

The present invention relates to a pelletizing die for a synthetic resin extruding machine.

Pelletizing dies are widely used for shaping the primary raw materials in the synthetic macromolecule material manufacturing industry, and serve to manufacture pellets of synthetic resin which are used in molding.

Since the primary raw material is generally in the shape of powder or in the melted state, the raw material is usually mixed and kneaded, caused to pass through a die to be formed into a rope-like shape, and then cut by a cutter blade rotating at a high speed to thereby obtain pelletized material. However, because the rope-like synthetic resin extruded out of the nozzle is low in viscosity, the rope-like synthetic material cannot be properly cut off, so that each pellet may leave a tail which distorts the pellet's shape and thereby reduces the commercial value of the pellets. This can result when the force urging the cutter blade against the die is weak or when the parallelism between the die surface and the cutter blade is not good. If the cutter blade is strongly urged against the die to solve this problem, the die surface will be quickly worn out. For this reason, in the prior art, a sintered hard tip 1 or 2 made of a sintered hard alloy and formed into a cylindrical shape or into a rectangular tile-like shape, as shown in FIG. 1 or in FIG. 2 respectively, is embedded and fixed by soldering in a die body 4 of a pelletizing die 3. These structures are shown in FIGS. 4 and 5, which are partial views taken along the line IV—IV of FIG. 3 which is a plan view of a pelletizing die. In an arrangement, a sintered hard tip 1 or 2 is not produced in advance and a sintered hard alloy such as a tungsten carbide alloy is metal-sprayed onto a die surface to form a hardened layer corresponding to the sintered hard tip 1 or 2.

The thus arranged conventional pelletizing die is disadvantageous in that the sintered hard tip 1 or 2 or the hardened layer may come off after an operation time of about one year, because the coefficient of linear expansion of the die body is largely different from that of the sintered hard tip 1 or 2 or the hardened layer due to the difference in their material quality. Therefore, the soldered portion is apt to be cracked due to the temperature changes and the electrical corrosion which occurs at the soldered portion due to warm water, and the sintered hard tip 1 or 2 or the hardened layer is subjected to shocks due to the high speed rotation of the cutter blade, so that the adhesive force at the soldered portion is weakened to cause a crack.

SUMMARY OF THE INVENTION

The present invention is intended to eliminate the disadvantage of the conventional pelletizing die, and an object of the present invention is to provide a pelletizing die for a synthetic resin extrusion machine in which the sintered hard tip cannot come off even if the above-mentioned phenomena occur.

In order to attain this object, according to the present invention, the pelletizing die for a synthetic resin extruding machine is characterized in that the outer diameter of a sintered hard tip is shaped so as to be relatively small at the outlet side for discharging melted synthetic resin while relatively large at the inlet side. In order to fix the sintered hard tip in contact with the die face, there is provided a sintered hard tip pressing plate formed with a hole into which the sintered hard tip can be fixedly inserted, and which is arranged to correspond to a nozzle hole of the die. The sintered hard tip and the sintered hard tip pressing plate are fixedly bonded to each other by soldering.

DETAILED DESCRIPTION OF THE INVENTION

Figure 1:
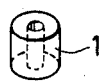
FIG. 1 is a perspective view of a cylindrical sintered hard tip used in a conventional pelletizing die.
Figure 2:
FIG. 2 is a perspective view of a rectangular tile-like sintered hard tip used in a conventional pelletizing die.
Figure 3:
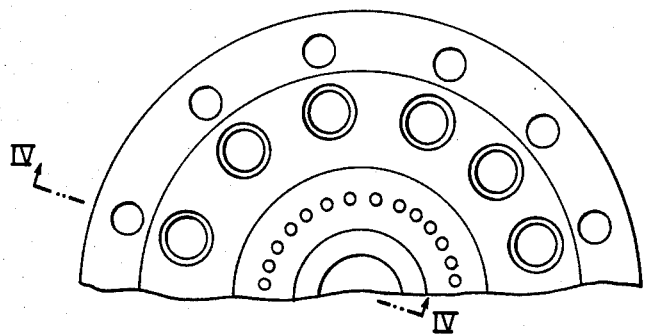
FIG. 3 is a plan view of a conventional pelletizing die.
Figure 4:
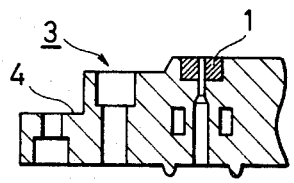
FIGS. 4 and 5 are partial cross-sectional views along the IV—IV line in FIG. 3, where the cylindrical and rectangular tile-like sintered hard tips are incorporated, respectively.
Figure 5:
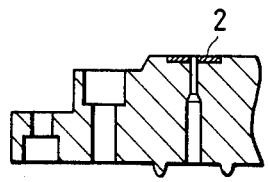
Figure 6:
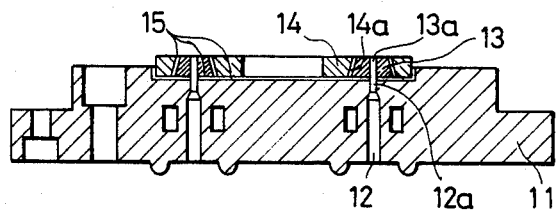
FIG. 6 is a longitudinal cross-sectional view of an embodiment of the pelletizing die according to the present invention.
Figure 8:
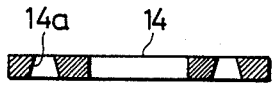
FIG. 8 is a longitudinal cross-sectional view of a sintered hard tip pressing plate incorporated into the pelletizing die of FIG. 6.

Referring to FIGS. 6 and 8, an embodiment of the present invention will be described hereafter.

Figure 7:
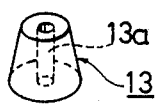
FIG. 7 is a perspective view of the conical sintered hard tip incorporated into the pelletizing die of FIG. 6.

In FIG. 6, a molding/extruding nozzle hole 12 is formed in a die body 11, and an outlet end portion 12a is formed at the discharging side of the nozzle hole 12. As shown in FIG. 7, a conical sintered hard tip 13 has a hole 13a formed at its center portion with the same diameter as the outlet end portion 12a. The larger outer diameter side of the sintered hard tip 13 is arranged to face the die body 11 when the sintered hard tip is attached. As shown in FIG. 8, a sintered hard tip pressing plate 14 is formed with a hole 14a such that the conical outer surface of the conical sintered hard tip 13 is fixedly engaged with the conical inner surface of the hole 14a so as to fixedly attach the sintered hard tip 13 to the die body 11. The hole 14a corresponds to the outlet end portion 12a of the die body 11, and the hole 13a is made to be coaxial with the outlet end portion 12a when the conical sintered hard tip 13 and the sintered hard tip pressing plate 14 are fixedly bonded to each other by soldering as indicated by reference numeral 15. The conical sintered hard tip 13 is made of a sintered hard alloy, while each of the die body 11 and the sintered hard tip pressing plate 14 are made of a metal material other than such a sintered hard alloy. For example, the sintered hard tip pressing plate 14 may be is made of a stainless steel material.

Although the sintered hard tip 13 is formed into a conical shape in the above-mentioned embodiment, it is not always necessary to do so. That is, the sintered hard tip 13 and the hole 14a of the sintered hard tip pressing plate 14 may alternatively be formed to have a stepped outer surface portion and a stepped inner surface portion, respectively, so that the stepped outer surface of the sintered hard tip 13 can be fitted to the inner stepped surface of the hole 14a.

With the arrangement described above, the pelletizing die according to the present invention exhibits the following advantages:

(1) Since the sintered hard tip 13 is pressed by the sintered hard tip pressing plate 14 to prevent the tip from coming off, the sintered hard tip 13 cannot come off even when the soldered portion is cracked;

(2) In the case where the sintered hard tip pressing plate 14 is made of a stainless steel material, there is no risk of a crack occurring in operation.

(3) In the case where the sintered hard tip 13 has been worn, the sintered hard tip 13 can be easily removed from the die body 11, because the sintered hard tip 13, the sintered hard tip pressing plate 14 and the die body 11 are bonded to each other by soldering; and (4) The soldering temperature is within a temperature range of 700°–1200° C. and this heating is not locally effected in the front surface of the die body, as performed for example in metal spraying in forming a hardened layer, but it is performed in the whole of the die so that there is no risk of occurrence of local shrinkage at the front face of the die body, with the result that little distortion of the die as well as little displacement and deformation of the nozzle hole may be generated.

We claim:

1. A pellitizing die for a synthetic resin extruding machine, said die comprising:

a die body having a nozzle with a predetermined diameter through which melted synthetic resin is to be extruded;

a tip having end surface portions and an outer surface portion of a predetermined shape and predetermined maximum dimensions, and having a centrally located hole of said predetermined diameter; and a tip pressing plate having an aperture formed to surround said outer surface portion of said tip and having dimensions at an outwardly facing end thereof which are smaller than said maximum dimensions of said tip, for securing said tip against said die body.

2. A pelletizing die, as claimed in claim 1, wherein said predetermined shape of said tip is substantially conical.

3. A pelletizing die, as claimed in claim 1, wherein said predetermined shape of said outer surface portion of said tip is stepped and wherein said tip pressing plate has an inner stepped surface so that said stepped outer surface portion of said tip can be fitted to said inner stepped surface of said tip pressing plate.

4. A pelletizing die, as claimed in claim 1, wherein said tip is made of a sintered hard alloy.

5. A pelletizing die, as claimed in claim 1, wherein said tip is fixed to said tip pressing plate by solder.

6. A pelletizing die, as claimed in claim 5, wherein said tip pressing plate is fixed to said die body by solder.

* * * * *